United States Patent [19]

Massa

[11] Patent Number: 5,127,780
[45] Date of Patent: Jul. 7, 1992

[54] EXPANDABLE HOLDING DEVICE USING A FUSIBLE ALLOY

[75] Inventor: Ted R. Massa, Latrobe, Pa.

[73] Assignee: Kennametal Inc., Latrobe, Pa.

[21] Appl. No.: 725,125

[22] Filed: Jul. 3, 1991

Related U.S. Application Data

[63] Continuation-in-part of Ser. No. 585,447, Sep. 20, 1990, Pat. No. 5,030,048.

[51] Int. Cl.⁵ .......................... B23C 5/26; B23B 31/10
[52] U.S. Cl. .................................. 409/234; 279/2.01; 279/2.08; 285/381; 403/272; 408/240
[58] Field of Search ................... 29/559, 447; 409/232, 409/234, 131; 408/238, 239 R, 239 A; 403/272, 273; 285/381; 279/1 A, 1 ME, 2 A, 2 R, 4, 9 R; 269/7; 242/72 R

[56] References Cited

U.S. PATENT DOCUMENTS

| | | | |
|---|---|---|---|
| 3,790,152 | 2/1974 | Parsons | 269/7 |
| 3,989,260 | 11/1976 | Zonkov et al. | 279/4 |
| 4,035,007 | 7/1977 | Harrison | 285/381 |
| 4,149,911 | 4/1979 | Clabburn | 285/381 Y |
| 4,262,917 | 4/1981 | Ottestad | 279/4 |
| 4,387,906 | 6/1983 | Nicolin | 279/2 A |
| 4,629,378 | 12/1986 | Parsons | 409/131 |
| 4,677,792 | 7/1987 | Speidel | 51/168 |
| 4,730,382 | 3/1988 | Parsons | 29/563 |
| 4,976,307 | 12/1990 | Hall et al. | 29/447 X |

FOREIGN PATENT DOCUMENTS

| | | | |
|---|---|---|---|
| 535905 | 10/1931 | Fed. Rep. of Germany | 269/7 |
| 167992 | 7/1987 | Japan | 285/381 |
| 776848 | 11/1980 | U.S.S.R. | 269/7 |
| 837590 | 6/1981 | U.S.S.R. | 279/2 R |
| 844151 | 7/1981 | U.S.S.R. | 279/2 R |
| 1220879 | 6/1984 | U.S.S.R. | 279/2 A |
| 1207642 | 1/1986 | U.S.S.R. | 279/2 A |

OTHER PUBLICATIONS

Hertel Catalog, 1001GB, "High-performance Tools for Machining Centres", (6 pages).
Schunk USA High Technology Workholding Catalog, "Ultra Precision Hydraulic Chucks/Expanding Arbors", (4 pages).

*Primary Examiner*—William Briggs
*Attorney, Agent, or Firm*—James G. Porcelli

[57] ABSTRACT

An expandable holding device for holding a component in which the clamping force is brought about by the solidification and expansion of a fusible alloy. The alloy is contained in an expansion chamber defined in part by a thin-walled, expansion sleeve. The alloy has a low melting point and expands when it solidifies. The pressure caused by expansion of the fusible alloy radially expands the expansion sleeve causing the expansion sleeve to grip the component. To release the component, the alloy is heated and liquified so that the expansion sleeve returns to an unexpanded condition.

19 Claims, 7 Drawing Sheets

FIG. 6 ature than shrink fit chucks. Additionally, there is no# EXPANDABLE HOLDING DEVICE USING A FUSIBLE ALLOY This application is a continuation-in-part of U.S. patent application Ser. No. 07/585,447 filed Sep. 20, 1990 entitled "Expandable Tool Holding Device Using a Fusible Alloy" and issued on Jul. 9, 1991 as U. S. Pat. No. 5,030,048.

BACKGROUND OF THE INVENTION

This invention relates to a holding device for holding a component, such as a tool or workpiece, and more particularly to an expandable holding device in which an expansion sleeve is radially displaced to grip the component.

Various types of expandable chucks and arbors are known for clamping a tool or workpiece on a support member. Known expandable chucks and arbors usually include a thin-walled, expansion sleeve which defines a pressure chamber. A screw and piston arrangement is used to force a fluid into the pressure chamber. The fluid exerts pressure against the thin-walled expansion sleeve causing it to deform radially to grip the tool or workpiece. Examples of these types of devices are shown in U.S. Pat. Nos. 4,387,906 and 4,677,792.

Another type of chuck which is known is the shrink-fit chuck. In a shrink-fit chuck, the tool shank is made slightly larger than the opening in the chuck. The chuck is heated to cause expansion of the opening sufficient to permit insertion of the tool. Once the tool is inserted, the chuck is allowed to cool. As the chuck cools, it contracts to grip the tool shank.

Both fluid expandable chucks and shrink fit chucks are able to achieve accurate and repeatable positioning of the tool or workpiece. Additionally, both have excellent gripping capabilities. Shrink-fit chucks also provide excellent rigidity, whereas fluid expandable chucks are only average in this respect. However, both shrink-fit chucks and fluid expandable chucks have significant drawbacks.

Fluid expandable chucks are generally large and cumbersome. Also, they are susceptible to leakage during operation which makes them less reliable than other chucking devices. The primary disadvantage of shrink-fit chucks is that they can be difficult to use. For instance, it is sometime difficult to remove a tool from the chuck since heating the chuck causes the tool to be heated by conduction as well. Moreover, relatively high temperatures are needed in order to effect sufficient expansion of the chuck to remove the tool.

SUMMARY AND OBJECTS OF THE INVENTION

The present invention overcomes the disadvantages of the prior art expandable chucks by using a fusible alloy to deform the expansion sleeve. The chucking device is extremely compact, very accurate, extremely stiff, has excellent gripping capabilities, and is reliable and relatively easy to use.

The invention includes a support member, or first member, which may be a chuck or an arbor. The support member is formed with an annular chamber or reservoir formed in part by a relatively thin expansion sleeve. The expansion chamber is filled with a bismuth alloy which melts at very low temperatures (from below room temperature up to several hundred degrees Fahrenheit) and expands when it solidifies. The expansion of the alloy upon solidification radially deforms the expansion sleeve which in turn causes the expansion sleeve to grip the tool or workpiece, or second member, with a very high gripping force.

The reservoir geometry, sleeve geometry, and bismuth alloy can all be selected to provide a particular melt temperature, sleeve deformation, and gripping force. The design results in a chuck or arbor which is nearly as compact as shrink fit chucks and mill style chucks but which can be activated at much lower temperature than shrink fit chucks. Additionally, there is no risk of fluid leaking during operation, like a hydraulic chuck, because the alloy is solid when the chuck is in use. Further, since the expansion chamber is filled with a solid material, the chuck of the present invention has a stiffness which is higher than fluid expansion chucks having the same size envelope. Accuracy and repeatability of tool placement is also excellent.

Based on the foregoing, it is apparent that the primary object of the present invention is to provide a holding device which is able to grip a member, such as a tool or workpiece, with a relatively high gripping force and which achieves accurate and repeatable placement of the member.

Another object of the present invention is to provide a holding device which is suitable for high speed tooling.

Another object of the present invention is to provide a holding device which has above average strength and stiffness.

Another object of the present invention is to provide a holding device which is reliable and avoids frequent breakdowns or failures.

Another object of the present invention is to provide a holding device which is contained in a compact envelope.

Another object of the present invention is to provide a holding device which is relatively easy to use.

DETAILED DESCRIPTION OF THE INVENTION

Figure 1:
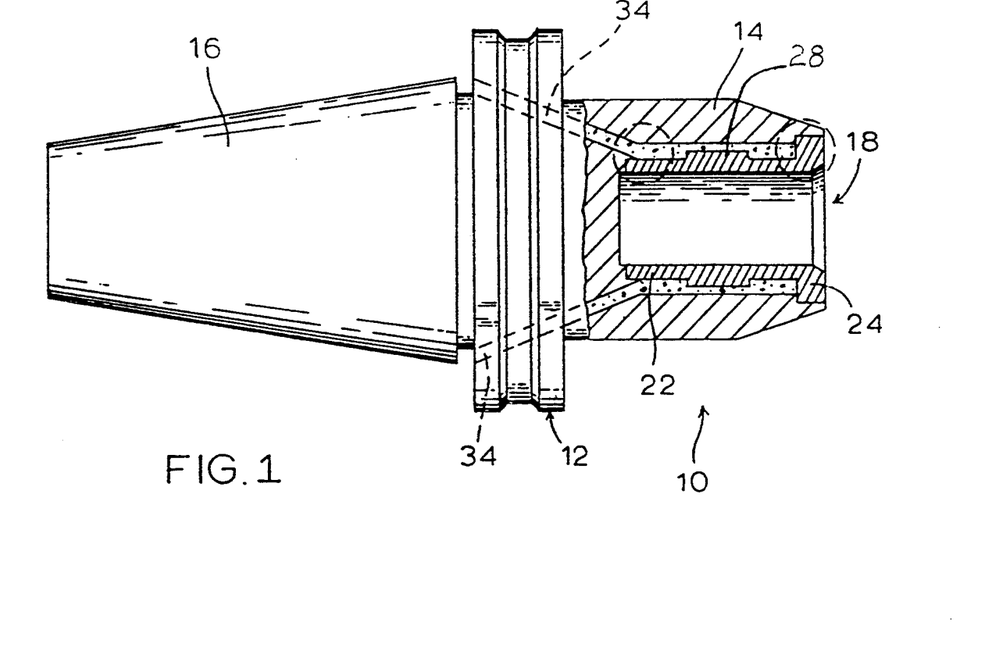
FIG. 1 shows an expandable chuck in axial, part sectional view.

Referring now to FIG. 1, a preferred embodiment of the present invention is shown therein and indicated generally by the numeral 10. The invention includes a tool support member 12, or first member, in the form of a chuck having a forward section 14 and a tapered rear section 16. The tapered rear section 16 is adapted to mount to the spindle of a machine tool. The forward section 14 is formed with an axial bore 18 which is adapted to receive the shank of a tool or a tool holder, or second member (not shown). A recessed flange seat 20 is formed at the forward end of the axial bore 18. A thin-walled expansion sleeve 22 having a flange 24 is mounted inside the axial bore 18 with the flange 24 seating in the flange seat 20 of the chuck body 12. The expansion sleeve 22 extends along a substantial portion of the axial bore 18. An annular expansion chamber 30 is formed in the forward section 14 between the expansion sleeve 22 and the chuck body 12. In other words, the expansion sleeve 22 forms one wall of the expansion chamber 30.

Figure 1A:
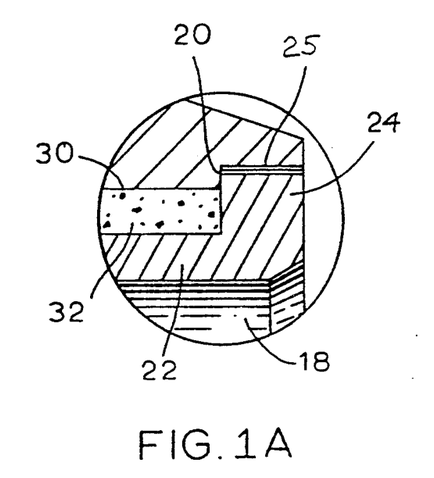
FIG. 1A is an enlargement of a portion of FIG. 1 illustrating how the expansion sleeve is mounted.
Figure 1B:
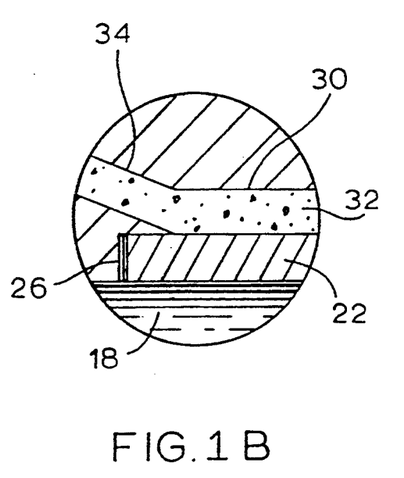
FIG. 1B is an enlargement of a portion of FIG. 1 illustrating how the expansion sleeve is mounted.

As shown best in FIGS. 1A and 1B, the expansion sleeve 22 is fixedly secured in the axial bore 18. A preferred means of securing is by welding the expansion sleeve 22 to the chuck body 12. In FIGS. 1A and 1B, the numbers 25 and 26 indicate the weld used to secure the expansion sleeve 22 to the chuck body 12. One weld 25 is made along the periphery of the flange as seen in FIG. 1A. The other weld 26 is made where the end of the expansion sleeve 22 meets the chuck 12. Electron beam welding is preferred because it provides a narrow and very deep weld. Alternatively, the expansion sleeve 22 can be laser welded or brazed.

The expansion sleeve 22 may include one or more raised sections. The embodiment shown includes a single raised section 28 which extends around the center of the expansion sleeve 22. The raised section 28 of the expansion sleeve 22 will cause the sleeve 22 to assume a non-uniform curvature when the sleeve 22 is deformed so that the sleeve 22 will grip the tool at two spaced apart locations.

The expansion chamber 30 is filled with a fusible material which expands when it solidifies. A suitable material having this unusual property is a bismuth alloy. Generally speaking, a class of bismuth alloys exists which possesses the usual property of expanding when it solidifies and also may have low melting points which may range from ambient temperatures to several hundred degrees Fahrenheit. The present invention uses a bismuth alloy from Indium Corporation of America called "Indalloy 158." The alloy contains 50% bismuth, 26.7% lead, 13.3% tin and 10% cadmium. The alloy has a melting point of 158° F. and is eutectic. The alloy is also commonly known as "Lipowitz's metal."

The expansion chamber 30 is filled through two fill holes 34. One angled fill hole 34 is connected to a vacuum pump via a stop-cock valve (not shown). The other angled fill hole is connected to an external reservoir containing the Bismuth alloy. The alloy must be heated during filling to maintain the alloy in a liquid state.

To fill the expansion chamber 30, the stop cock valve is connected to the vacuum pump to evacuate the expansion chamber 30. Once the expansion chamber 30 is evacuated, the stop-cock valve connected to the external reservoir is opened and the alloy 32 is drawn into the expansion chamber 30 by the vacuum. When the expansion chamber 30 is completely filled, plugs (not shown) are inserted into the fill holes, and welded in place. Alternatively, threaded plugs could be used which simply screw into the ends of the fill holes 34.

Upon solidification, the bismuth alloy 32 undergoes a volumetric expansion of approximately 1.7%. Due to the elongated configuration of the expansion chamber 30 and the relative rigidity of the expansion chamber 30 at the ends, the expansion of the alloy 32 occurs almost totally in the radial direction. The expansion of the alloy 32 causes the expansion sleeve to deform radially inwardly to grip the shank of a tool or a tool holder. When the alloy 32 is heated to a temperature above 158°, the alloy liquifies. The alloy takes up less volume in a liquid state thus allowing the expansion sleeve 22 to resiliently return to an undeformed condition.

There are numerous methods available for heating the chuck 12. For instance, the present invention may be carried out using resistance heaters, induction heaters, hot water coils, or any other heating method. The particular method used is not critical. The chuck 12 can be cooled by conduction, air, water or other means.

Figure 2A:
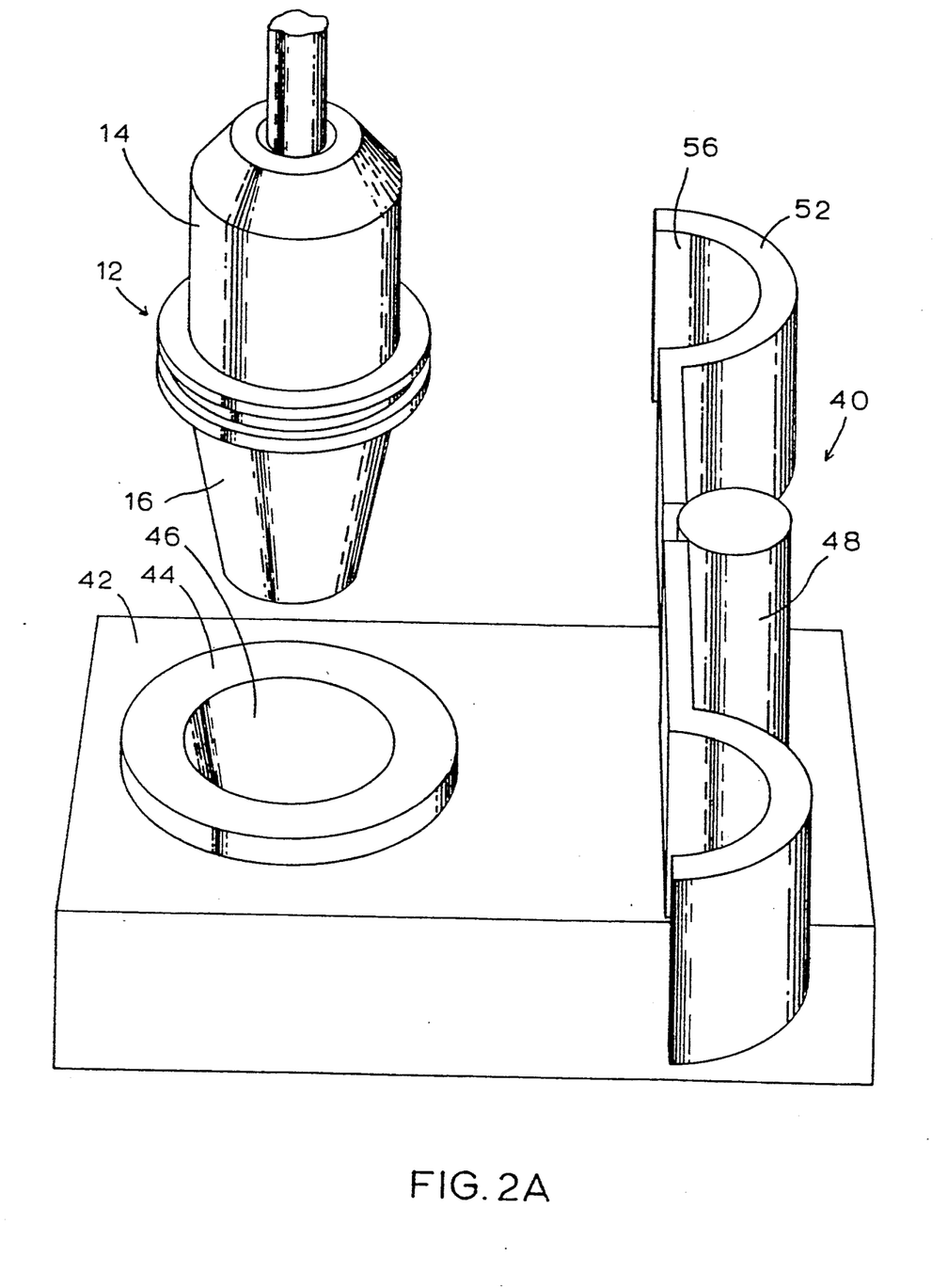
FIG. 2A is a perspective view of a tool set-up assembly.
Figure 2B:
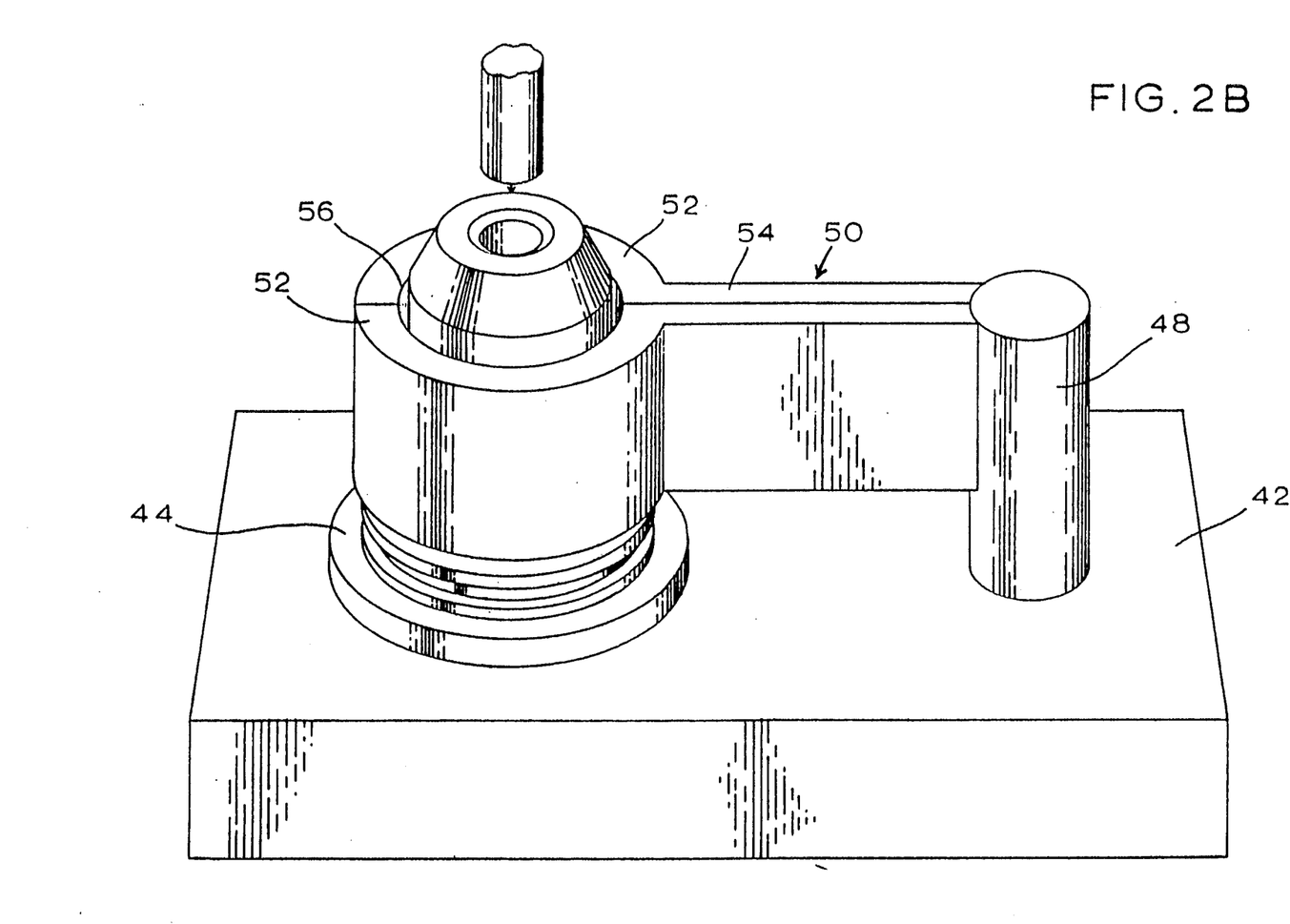
FIG. 2B is a perspective view of the tool set-up assembly with the chuck of the present invention mounted thereon.

In FIGS. 2A and 2B, a tool set-up assembly 40 is shown which employs a resistance-type heating element. The tool set-up assembly 40 includes a base 42 with a tool support collar 44 mounted thereon. The tool support collar 44 has a tapered, tool-receiving opening 46 into which the rear end 16 of the chuck 12 can be inserted.

Mounted to the base adjacent the collar 44 is a support post 48. The support post 48 supports a heater assembly indicated generally 50. The heater assembly 50 includes two half cylinders or split rings 52 and two support arms 54. The split rings 52 and support arms 54 preferably contain an insulating material which may be ceramic or heat resistant plastic or foam. One such material suitable for this purpose may be silicone rubber.

The split rings 52 each contain a heating element 56 for heating the chuck. The heating element 56 in the preferred embodiment is a resistance element. In the embodiment shown, the resistance element is a thin foil made of a resistive nickel alloy which is 80% nickel and 20% chrome. The foil is applied to the inner surface of the split rings 52. Current is applied to the resistance elements by conductors (not shown) which pass through a hollow space in the post 48.

Figure 3A:
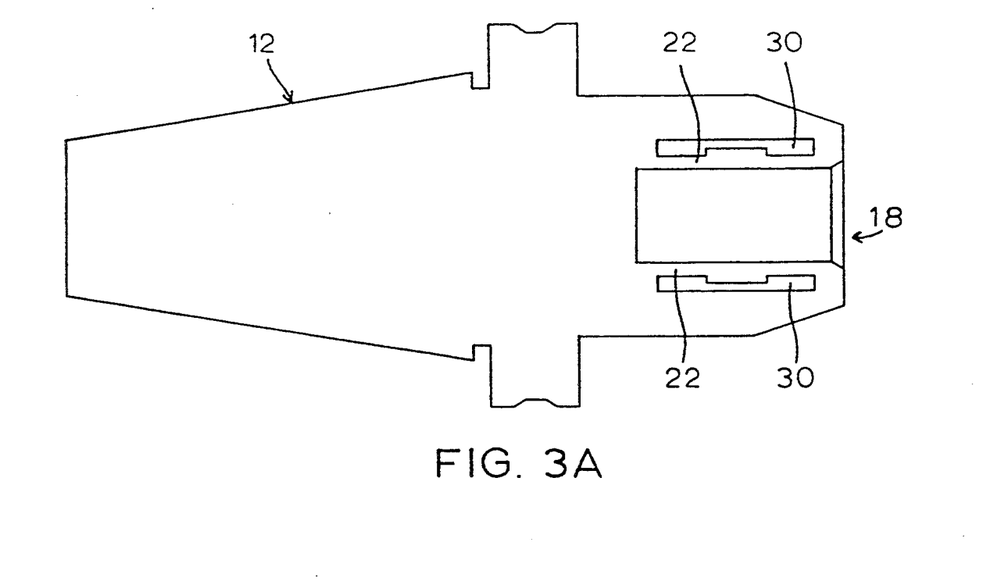
FIGS. 3A-3D are schematic representations of the expandable chuck illustrating its operation.

To heat the chuck body 12, the heating assembly is opened, as shown in FIG. 2A, and the chuck body 12 is inserted into the collar 44. The heating assembly 50 is then closed, as shown in FIG. 2B, and current is applied to the heating elements. Preferably, the amount of current applied should be sufficient to heat the chuck body and melt the alloy in approximately 15 seconds. Once the alloy melts, the expansion sleeve 22 assumes a relaxed condition as shown in FIG. 3A. The tool can then be inserted into the chuck body 12.

Figure 3B:
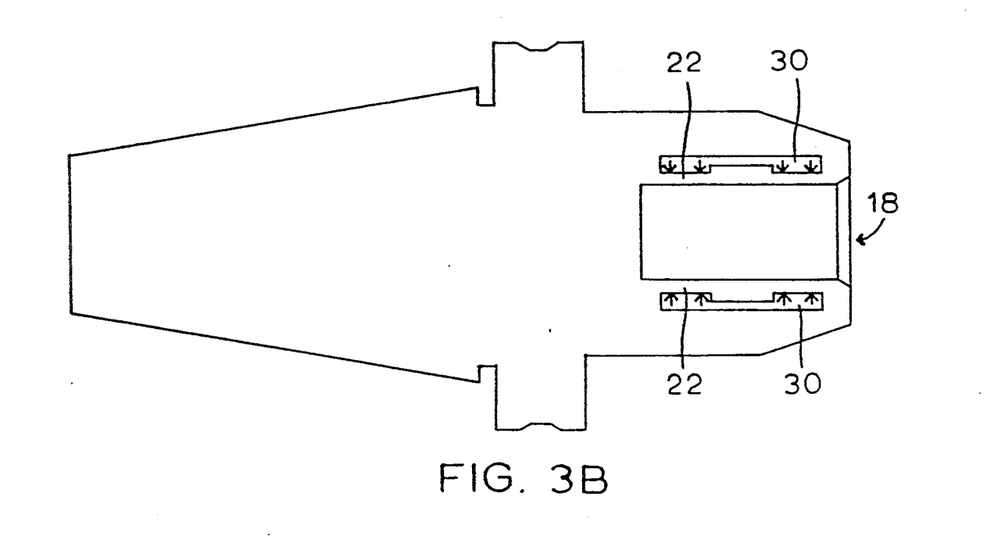
Figure 3C:
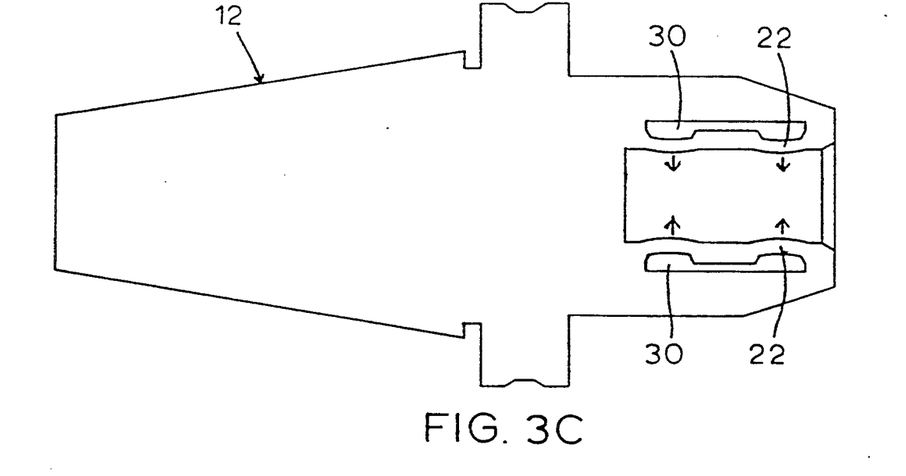

After inserting the tool, the current is shut off. Because of the relatively large surface area of the foil-type resistance element, the resistance element will air cool in a very short period of time. Also, because the alloy 32 is eutectic, it will solidify rapidly once the temperature of the alloy 32 falls below the melting point. As the alloy 32 solidifies it undergoes expansion, primarily in the radial direction. Thus a force is exerted against the expansion sleeve as shown in FIG. 3B. The solidification of the alloy thus causes the expansion sleeve 22 to deform radially inwardly as shown in FIG. 3C.

Figure 3D:
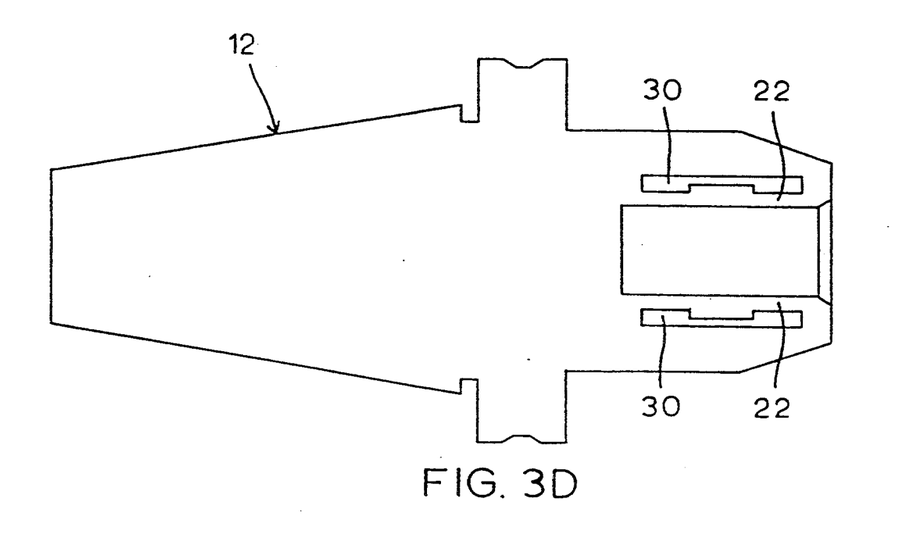

When the alloy is reheated, the expansion sleeve 22 again returns to a relaxed condition as shown in FIG. 3D. In the preferred embodiment of the invention, the greatest expansion of the sleeve 22 occurs at two axially spaced locations due to the reinforcement at the center of the expansion sleeve 22. As a result, the tool will be gripped at two axially spaced locations. Without the reinforcement at the center of the expansion sleeve 22, the sleeve 22 would tend to bow inwardly with the greatest deformation occurring near the center. Thus, the tool would be gripped primarily at a single location and would therefore have a tendency to wobble. By designing the expansion sleeve 22 to grip the tool at two axially-spaced locations, the tool is gripped tightly without any tendency to wobble.

The expansion chamber geometry, sleeve geometry and bismuth alloy can all be selected to provide a particular melt temperature, sleeve deformation and gripping force. The sleeve deformation, gripping force and heat input required to activate chuck has been calculated for chuck having the following dimensions:

| | |
|---|---|
| inside diameter of sleeve | 1.25 inches |
| outside diameter of sleeve | 1.40 inches |
| outside diameter of reservoir | 1.70 inches |
| outside diameter of chuck | 2.30 inches |
| length of chuck | 2.00 inches |

Without a tool in the chuck, the inside diameter of the sleeve will deform inwardly approximately 0.0026 inches. The outside diameter of the chuck body will expand 0.0016 inches. Obviously, these values can be changed by altering the relative sizes of the sleeve and expansion chamber. The grip force on the tool, assuming that the tool has a diameter equal to the "free" diameter of a sleeve, would be approximately 38,000 lbs/in$^2$. For the 1.25" diameter tool in a two inch long sleeve, assuming the entire expansion sleeve deforms uniformly, the total grip force on the tool would be 299,000 lbs. The power required, assuming no radiation, conduction or convection losses, to heat the chuck body to 158° F. and to melt the alloy in a 15 second time period would be approximately 1584 watts.

Figure 4:
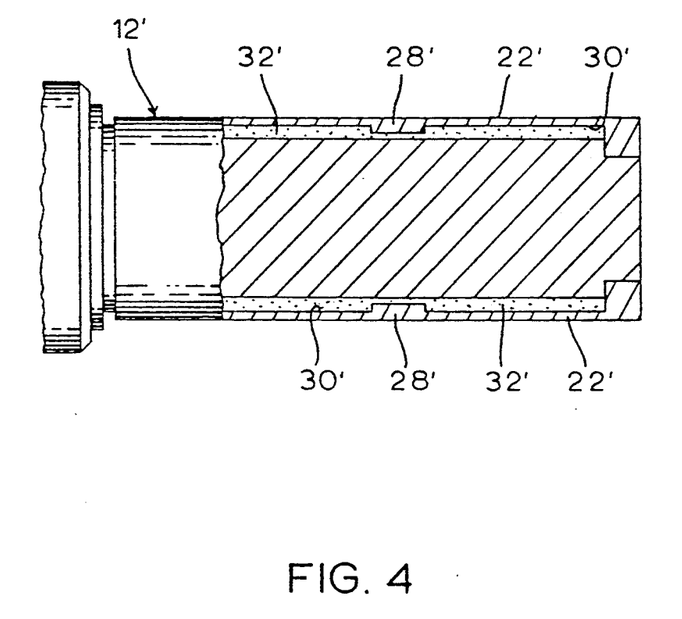
FIG. 4 shows an expandable arbor in axial, part sectional view.

Referring now to FIG. 4, a second embodiment of the present invention is shown therein. The second embodiment includes a support member, or first member, in the form of an arbor 12'. An expansion sleeve 22' extends circumferentially around the arbor 12' and defines an expansion chamber 30' between the arbor 12' and sleeve 22'. As in the first embodiment, the sleeve 22' is fixedly secured to the arbor 12' by welds and defines an expansion chamber 30' between the arbor 12' and expansion sleeve 22'. The expansion chamber 30' is also filled with a Bismuth alloy 32' in the same manner as previously described.

The expandable arbor functions in the same way as the expandable chuck of the first embodiment. When the alloy 32' solidifies, the expansion sleeve 22' is deformed radially outwardly to engage the tool or workpiece, or the second member. As in the first embodiment, the expansion sleeve 22' includes a raised section 28' so that the expansion sleeve 22' grips the tool or workpiece at two axially spaced locations.

The present invention has many advantages over prior art chucks. Unlike fluid expandable chucks, there is no danger of the fluid leaking during operation since the alloy is solid. Further, because the alloy is solid the chuck is extremely rigid. In contrast to shrink fit chucks, the chuck of the present invention is far easier to use since the tool can be released at relatively low temperatures.

In comparison to fluid expandable chucks and shrink fit chucks, the present invention has most of their advantages. The present invention is capable of accurate and repeatable positioning of the tool or workpiece. Additionally, the gripping ability of the present invention is excellent. Thus, the present invention exploits the advantages of prior art expandable chucks while avoiding their disadvantages.

Although FIGS. 1-3 describe an embodiment of this invention in which a chuck secures a toolholder, and FIG. 4 describes an embodiment of this invention applied to an arbor, it should be understood that the use of a fusible material as an expandable holding device has a larger variety of applications than those discussed with FIGS. 1-4.

Figure 5:
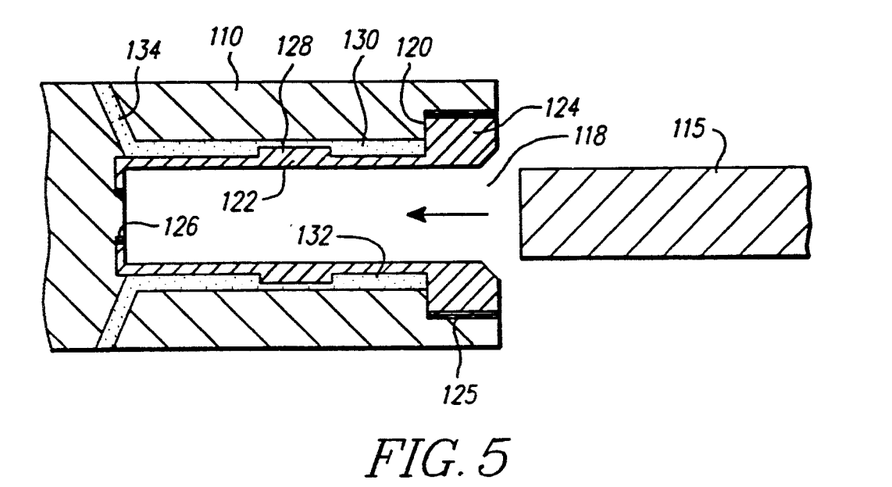
FIG. 5 illustrates an embodiment of the invention in which a second member is secured to a first member using a chuck-like device.
Figure 6:
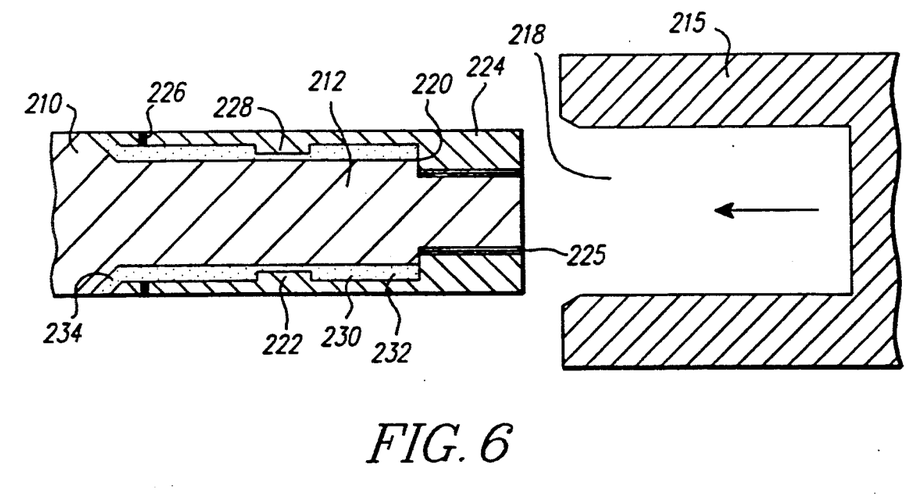
FIG. 6 illustrates an embodiment of the invention in which a second member is secured to a first member in an arrangement similar to that of an arbor.

FIGS. 5 and 6 show the general application of a fusible material in providing an expandable holding device for securing two parts to one another. The fusible material may be utilized to reduce the size of a bore such that a member introduced into the bore could be compressed by the fusible material and thereby held within the bore. On the other hand, the fusible material may be utilized on a member which will be introduced to the bore of another member. In this situation, the fusible material expands the sleeve of a first member outwardly, thereby securing the member within the bore of a second member. FIGS. 5 and 6, respectively, will be used as examples of these embodiments.

FIG. 5 shows a cut-away view of a first member 110 which will be used to hold a second member 115. Within the first member 110 is a bore 118. The first member has a recessed flange seat 120 for receiving a thin-walled expansion sleeve 122. The expansion sleeve 122 has, at one end, a flange 124, which abuts the recessed flange seat 120. In order to secure the expansion sleeve 122 within the bore 118 of the first member 110, the expansion sleeve flange 124 is secured to the first member 110. This may be done using a weld 125 between the two surfaces. In addition, the expansion sleeve 122 is secured to the first member 110 at the opposite end of the bore 118 through a second weld 126. The welds 125 and 126 extend around the bore 118 to form seals between the first member 110 and the sleeve 112.

As mentioned earlier, and as illustrated in FIGS. 3A-3D, to provide regions of contact of the expansion sleeve 122 onto the second member 115, at least one raised section 128 may be provided on the expansion sleeve 122.

With the expansion sleeve 122 secured within the bore 118, there exists an expansion chamber 130 which may be filled with a liquid fusible material 132 via fill holes 134. When the expansion chamber 130 and fill holes 134 are filled, then the fill holes 134 are sealed.

With this arrangement when the fusible material 132 cools below the melting point, the fusible material 132 solidifies and expands. As a result the expansion sleeve 122 will be urged inwardly against the second member 115.

The operation of this expandable holding device is similar to that discussed in FIGS. 1-3D and, as such, the discussion presented for these earlier figures may also be referenced for further understanding of the expandable holding device shown in FIG. 5.

The first member 110 and the second member 115 are intentionally shown broken and unanchored to stress that this arrangement may be utilized as a general coupling between the first member 110 and the second member 115 and there is no requirement for either member 110 or member 115 to be an anchor for the other. This arrangement in FIG. 5 can be used when the first member 110 is anchored, when the second member 115 is anchored, or when both the first member 110 and the second member 115 are anchored or unanchored.

While FIG. 5 shows the expandable holding device to be a female part, FIG. 6 illustrates the expandable holding device to be a male part. In FIG. 6, the first member 210 is to be joined to a second member 215. The second member 215 has a bore 218 having an inner diameter similar to that of the external diameter of the first member 210. The first member 210 has an insertion portion 212 with a recessed flange seat 220. A thin-walled expansion sleeve 222 is placed over the insertion portion 212 of the first member 210, such that a flange 224 on the expansion sleeve 222 abuts the recessed flange seat 220 of the first member 210. In order to secure the expansion sleeve 222, welds 225 and 226 are provided between the expansion sleeve 222 and the insertion portion 212. The welds 225 and 226 extend around the bore 218 to form seals between the first member 210 and the expansion sleeve 212. An expansion chamber 230 is formed between the insertion portion 212 and the expansion sleeve 222. A liquid fusible material 232 is introduced through fill holes 234 into the expansion chamber 230 of the first member 210.

Once the fusible material 232 is introduced to the expansion chamber 230 the fill holes 234 are sealed. Upon solidification, the fusible material 232 expands. This expansion acts against the expansion sleeve 222 thereby urging the sleeve 222 outwardly against the bore 218 of the second member 215.

At least one raised section 228 has been included with the expansion sleeve 222 to provide contact at different portions of the sleeve 222. Just as in FIG. 5, neither the first member 210 (FIG. 6) nor the second member 215 is shown to be anchored in any way and, as such, the arrangement in FIG. 6 can be used when the first member 210 is anchored, when the second member 215 is anchored or when both the first member 210 and the second member 215 are anchored or unanchored.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An expandable holding device comprising:
   a) a first member having a bore;
   b) a resilient expansion sleeve secured to the first member within the bore for receiving a second member;
   c) an expansion chamber defined between the first member and the expansion sleeve for containing a fusible material which expands when it solidifies;
   d) wherein upon solidification of the fusible material, the expansion sleeve is deformed to engage the second member; and
   e) wherein upon liquification of the fusible material, the expansion sleeve returns to a relaxed condition to release the second member.

2. The expandable holding device according to claim 1 wherein the bore and the expansion sleeve are cylindrical and the expansion sleeve deforms radially inwardly to engage the second member.

3. The expandable holding device according to claim 2 wherein the expansion chamber is an annular expansion chamber extending around the circumference of the bore.

4. The expandable holding device according to claim 2 wherein selected portions of the expansion sleeve are of a lesser thickness than adjacent portions to permit greater deformation and higher contact forces at selected portions of the expansion sleeve.

5. The expandable holding device according to claim 2 wherein the first member is a chuck and the second member is a tool, a toolholder or a workpiece.

6. The expandable holding device according to claim 1 further including a fusible material which expands when it solidifies contained within the expansion chamber so as to substantially fill the expansion chamber when the fusible alloy is in a liquid state.

7. The expandable holding device according to claim 6 wherein the fusible material is a bismuth alloy.

8. The expandable holding device according to claim 7 wherein the bismuth alloy solidifies and melts at a temperature between approximately 140 degrees and 180 degrees Fahrenheit.

9. An expandable holding device comprising:
   a) a first member having an insertion portion for insertion into a bore of a second member;
   b) a resilient, expansion sleeve secured about the insertion portion of the first member;
   c) an expansion chamber defined between the first member and the expansion sleeve for containing a fusible material which expands when it solidifies;
   d) wherein upon solidification of the fusible material, the expansion sleeve is deformed to engage the second member; and
   e) wherein upon liquification of the fusible material, the expansion sleeve returns to a relaxed condition to release the second member.

10. The expandable holding device according to claim 9 wherein the insertion portion of the first member and the expansion sleeve are cylindrical such that when the fusible material solidifies the expansion sleeve deforms radially outwardly to engage the second member.

11. The expandable holding device according to claim 10 wherein the expansion chamber is a single annular expansion chamber extending around the circumference of the first member insertion portion.

12. The expandable holding device according to claim 10 wherein selected portions of the expansion sleeve are of a lesser thickness to deform to a greater degree specific portions of the sleeve and provide multiple contact points between the sleeve and the second member.

13. The expandable holding device according to claim 10 wherein the first member is an arbor and the second member is a tool, a toolholder or a workpiece.

14. The expandable holding device according to claim 9 further including a fusible material which expands when it solidifies contained within the expansion chamber so as to substantially fill the expansion chamber when the fusible alloy is in a liquid state.

15. The expandable holding device according to claim 14 wherein the fusible material is a bismuth alloy.

16. The expandable holding device according to claim 15 wherein the bismuth alloy solidifies and melts at a temperature between approximately 140 degrees and 180 degrees Fahrenheit.

17. A method for securing and releasing a component on an expandable holding device having a support member, a resilient expansion sleeve, and an expansion chamber defined between the support member and the expansion sleeve comprising:
 a) filling the expansion chamber with a liquid fusible material having the property of expanding when it solidifies;
 b) inserting the component onto the holding device while the fusible material is in a liquid state;
 c) cooling the fusible material sufficient to solidify the material and expand the expansion sleeve; whereupon the expansion sleeve grips the component; and
 d) heating the fusible material to melt the fusible material and allow the expansion sleeve to return to an unexpanded condition thereby releasing the component.

18. The method according to claim 17 wherein the expansion sleeves expands radially inwardly to engage an outer surface of the component.

19. The method according to claim 17 wherein the expansion sleeve expands radially outwardly to engage an inner surface of the component.

* * * * *